Patented Nov. 28, 1950

2,531,832

UNITED STATES PATENT OFFICE 2,531,832

SILVER HALIDE DEVELOPERS CONTAINING POLYETHYLENE GLYCOLS

William Alexander Stanton, New Brunswick, N. J., assignor to E. I. du Pont de Nemours & Company, Wilmington, Del., a corporation of Delaware No Drawing. Application June 12, 1947,
Serial No. 754,279

7 Claims. (Cl. 95—88)

This invention is concerned with photography and, more particularly, with the development of latent silver halide images and with novel photographic developing compositions therefor.

An object of this invention is to provide improvemets in the development of silver halide images. A further object is to provide improved developer solutions. A still further object is to provide new developer solutions which have reduced induction periods. Another object is to provide a novel and economical means for improving developer solutions whereby changed speed of development and improved contrast of silver images results. Still other objects will be apparent from the following description of the invention.

It has been discovered that the addition of the polyalkylene glycols and especially the polyethylene glycols which contain at least nine —OCH$_2$CH$_2$— groups and their mono- and dialiphatic carboxylic acid esters to aqueous developer solutions is quite advantageous. The induction period of development of silver halide image records is markedly changed by such addition.

The polyoxyethylene compounds may be represented by the general formula

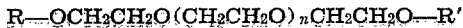

R—OCH$_2$CH$_2$O(CH$_2$CH$_2$O)$_n$CH$_2$CH$_2$O—R' wherein R is a member taken from the group consisting of hydrogen and aliphatic carboxylic acyl radicals of 1 to 18 or more carbon atoms, R' is a member taken from the class consisting of hydrogen and aliphatic carboxylic acid radicals of 1 to 18 or more carbon atoms and $n$ is 7 to 200 or more.

The aforesaid polyoxyethylene compounds may be added to the developer solutions at any stage in the preparation. They may be added as such or from an aqueous solution or from an organic solvent solution, e. g., ethanol, but are preferably added from solution in water.

Many of the polyglycols described above are commercially available, generally in the form of mixtures of varying molecular weight. The polyglycols can be prepared in various ways, for example, by removal of water from glycols and by the reaction of alkylene oxides, e. g., ethylene oxide with itself or lower glycols, e. g., ethylene glycol and diethylene glycol. The reactions are generally carried out until the products have an average chain length in excess of 7 alkylene oxide residues per molecule. Ethylene oxide, propylene oxide-1,2 and butylene oxide-1,2 can be used in the preparation of the products and they may be reacted with ethylene glycol, diethylene glycol. Their preparation is described in The Chemistry of Synthetic Resins on pages 990–994, published by Rheinhold Publishing Corportion (1935).

Polyethylene glycols falling within the above general formula include nonaethylene glycol, decaethylene glycol, dodecaethylene glycol and higher homologues containing from 9 to 200 —CH$_2$CH$_2$O— groups. The lower members of the class are viscous liquids to semi-solids and solids, at 20° C., which are somewhat hygroscopic up to a molecular weight in excess of 1500. The higher homologues are waxy solids and as their molecular weight increases to 4000 they become non-hygroscopic in character. The lower members of the series are easily soluble in water, the solubility becoming less as the molecular weights of the compounds increase. In general, the higher members of the series cannot be too easily isolated as single chemical entities. Instead, the condensation reaction leading to their preparation is carried to a point where the bulk of the material will consist of homologous compounds of similar chain length.

Mixtures of two or more polyalkylene glycols or polyoxyalkylene glycols are selected on the basis of average molecular weight. Since a difference of one or two ethylene oxide links in polymers of considerable chain length has a negligible effect on their physical and chemical properties, such mixtures can be readily employed in the present invention. For the purposes of this invention, it is sufficient to know the average molecular weight of the material to be used, and the fact that it may in all likelihood consist of a mixture of several compounds of closely similar molecular weights does not reduce its effectiveness.

The carboxylic acid esters can be made by acylating or esterifying the glycols with one or two mols of a carboxylic acid or a carboxylic acid chloride or anhydride so that one or both of the hydroxyl groups of the polyglycols are converted into ester groups. Among the useful specific agents useful for such reactions are: acetic acid, caproic acid, pelargonic acid, myristic acid, lauric acid, oleic acid, stearic acid, propionyl chloride, valeryl chloride, heptoyl chloride, palmityl chloride, butyric anhydride, etc.

The polyoxyalkylene compounds are useful with a wide variety of photographic developing agents including hydroquinone, chlorohydroquinone, pyragallol, p-aminophenol, ferrous oxalate, N-methyl-p-aminophenol sulfate, 2,4-diaminophenol, N-dialkyl phenylenediamines of the formula

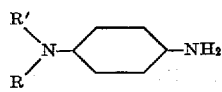

and their water-soluble salts, where R and R' are the same or different lower alkyl radicals, e. g., methyl and ethyl, 1,4-diaminobenzene, 1,4-diaminonaphthalene, p - aminodiethyltoluidine, and mixtures of two or more of such agents, etc.

The developers may contain the usual sulfites, e. g., sodium sulfite, potassium sulfite, potassium metabisulfite; alkalies, e. g., sodium or potassium carbonate, borax; soluble neutral salts, e. g., sodium bromide, potassium bromide; boric acid, formaldehyde, aldehydebisulfite complexes, etc.

The invention will be further illustrated by the following examples.

Example I

A negative type photographic film bearing a gelatino-silver iodobromide emulsion layer was exposed to an object. The exposed film was then divided into parts, one of which was developed in the following developer and one each was developed in respective developing solutions made by adding 0.5 gram of the respective polyethylene glycols and their long chain aliphatic carboxylic acid esters to the developers with the results given in the following table. The development time to reach a density of 0.02 above fog was measured. This time, called "Induction Period" is given in the table on a relative basis.

N-methyl-p-aminophenol sulfate_grams__ 0.74
Sodium sulfite (anhydrous) _____do____ 90.4
Hydroquinone _____do____ 1.0
Borax _____do____ 2.7
Potassium bromide_____do____ 0.14
Water to _____liter__ 1.0

| Developer | Relative Induction Period |
|---|---|
| Unmodified | 1.00 |
| Modified with A | .58 |
| Modified with B | .85 |
| Modified with C | .54 |
| Modified with D | Less than .50 |
| Modified with E | .60 |
| Modified with F | .67 |
| Modified with G | .67 |
| Modified with H | Less than .78 |
| Modified with I | .55 |

A is a mixture of polyethylene glycols containing an average of 9 —CH$_2$CH$_2$O— groups.
B is a mixture of polyethylene glycols containing an average of 12 —CH$_2$CH$_2$O— groups.
C is a mixture of polyethylene glycols containing an average of 80 —CH$_2$CH$_2$O— groups.
D is a mixture of polyethylene glycols containing an average of 120 —CH$_2$CH$_2$O— groups.
E is a mixture of the monolaurates of a mixture of polyethylene glycols containing an average of 9 —CH$_2$CH$_2$O— groups.
F is a mixture of the dilaurates of a mixture of polyethylene glycols containing an average of 9 —CH$_2$CH$_2$O— groups.
G is a mixture of mono-oleates of a mixture of polyethylene glycols containing an average of 9 —CH$_2$CH$_2$O— groups.
H is a mixture of the monolaurates of a mixture of polyethylene glycols containing an average of 12 —CH$_2$CH$_2$O— groups.
I is a mixture of the dilaurates of a mixture of polyethylene glycols containing an average of 12 —CH$_2$CH$_2$O— groups.

The effect of concentration is shown in the following table.

| Compound | Per Liter Developer | Relative Induction Period |
|---|---|---|
|  | Grams |  |
| None |  | 1.00 |
| A | 0.5 | .58 |
| A | 2.5 | .42 |
| E | 0.5 | .58 |
| E | 2.5 | .42 |

Example II

A commercial blue base X-ray film-screened type comprising a tinted base bearing a light-sensitive emulsion on each surface is given an X-ray sensitometric exposure under an aluminum step wedge of the usual type and divided into two parts which are respectively developed four minutes at 68° F. in the following developer and that developer modified by the addition of 0.5 gram per liter of compound D from Example I with the results tabulated below.

Grams
N-methyl-p-aminophenol sulfate_____ 5.0
Hydroquinone _____ 7.5
Sodium sulfite (anhydrous)_____ 60.0
Sodium carbonate (monohydrated)_____ 58.5
Potassium bromide_____ 4.5

| Developer | Relative Densities for Equal Exposure |
|---|---|
| Unmodified | 100 |
| Modified with D | 114 |

Example III

Three commercially available cine negative films bearing gelatino-silver iodobromide emulsion layers were tested in the presence and absence of 0.5 gram of compound C from Example I per liter in the following developer.

N-methyl-p-aminophenol sulfate__grams__ 0.74
Hydroquinone _____do____ 1.0
Sodium sulfite (anhydrous)_____do____ 90.4
Borax _____do____ 2.7
Potassium bromide_____do____ 0.14
Water to _____liter__ 1.0

The exposure was made in a standard cine sensitometer with development in a small loop machine at 68° F.

| Film | Speed [1] | | | Gamma | | | Fog | | |
|---|---|---|---|---|---|---|---|---|---|
| Developing time, min. | 5.5 | 8.5 | 14.5 | 5.5 | 8.5 | 14.5 | 5.5 | 8.5 | 14.5 |
| No compound C in the developer: | | | | | | | | | |
| 1 | 7.2 | 8.2 | 8.4 | .54 | .79 | .95 | .01 | .04 | .03 |
| 2 | 7.3 | 8.1 | 8.6 | .47 | .72 | .80 | .01 | .02 | .04 |
| 3 | 7.2 | 8.3 | 8.4 | .40 | .60 | .73 | .04 | .08 | .08 |
| 5 grams Compound C per liter of developer: | | | | | | | | | |
| 1 | 7.9 | 8.4 | 8.8 | .49 | .69 | .94 | .02 | .06 | .10 |
| 2 | 7.8 | 8.7 | 9.1 | .43 | .61 | .82 | .02 | .04 | .09 |
| 3 | 7.6 | 8.4 | 8.6 | .41 | .63 | .86 | .07 | .10 | .15 |

[1] A speed figure in which each unit represents a full camera stop difference in exposure.

Example IV

Two strips of a cine negative type of photographic film bearing a silver iodobromide emulsion layer were given a suitable step wedge exposure simultaneously on a sector wheel sensitometer of the intermittent time-scale type. The strips were respectively, developed for 12 minutes at 68° F. in the solution of the following composition and that modified by the addition of 0.5 of a gram per liter of sorbitan mono-oleate polyoxyethylene ether containing an average of 6 to 7 oxyethylene groups divided in 3 chains.

The results are given in the table.

N-methyl-p-aminophenol sulfate _____ grams__ 5.0
Sodium sulfite (desiccated) _____ do____ 100.0
Sodium metaborate _____ do____ 2.0
Sodium thiocyanate _____ do____ 1.0
Potassium bromide _____ do____ 0.50
Water to _____ liter__ 1.0

| Developer | Relative Densities for Equal Exposures |
|---|---|
| Unmodified | 100 |
| Modified | 50 |

Example V

Strips of a standard blue base X-ray film of the type described in Example II were exposed as described in that example and strips of a negative type cine film of the type described in Example IV were exposed as described in that example. One strip of each film was, respectively, developed in (a) a solution of ferrous oxalate (made by pouring 750 cc. of 18.5% potassium oxalate into 250 cc. of 18.5% ferrous sulfate aqueous solution) and (b) such a solution modified by the addition of 0.5 gram per liter of compound D of Example I. The developments were carried out for four minutes at 68° F. with the following relative densities for equal exposures.

| Developer | Negative Film | X-ray Film |
|---|---|---|
| Unmodified | 100 | 100 |
| Modified | 95 | 24 |

In place of the specific developing agents described in the above examples, there may be substituted other developing agents as described above. Likewise other polyglycols or their mono- and di-carboxylic acid esters and mixtures of such compounds can be substituted with similar results.

It is not known why the polyglycols and their esters confer beneficial results in the development of silver halide images. The compounds alter the induction period of development. Perhaps in doing so, latent image centers which were not previously developable are made developable. In some cases they are apparently rendered less developable. How these compounds alter the induction period is not known. It is suspected, however, that adsorption forces must play a part as it has been observed that all of the effective compounds are more or less strongly adsorbed to silver halide grains.

What is claimed is:

1. The process of developing a silver halide image with a photographic developer solution containing a silver halide photographic developing agent and a compound of the general formula R—OCH$_2$CH$_2$O(CH$_2$CH$_2$O)$_n$CH$_2$CH$_2$OR′ where R and R′ are members taken from the class consisting of hydrogen and aliphatic carboxylic acyl radicals of 1 to 18 or more carbon atoms and $n$ is 7 to 200.

2. The process of developing a silver halide image record with an aqueous alkaline photographic developer solution containing a silver halide photographic developing agent and a polyethylene glycol containing 9 to 200 —CH$_2$CH$_2$O— units.

3. The process of developing a silver halide image record with an aqueous alkaline photographic developer solution containing hydroquinone and 0.1 to 2.5 grams per liter of solution of a polyethylene glycol containing 9 to 200

—CH$_2$CH$_2$O— units.

4. An aqueous developer solution containing a silver halide photographic developing agent and a polyethylene glycol having a molecular weight of greater than 400.

5. An aqueous alkaline developer solution containing hydroquinone and a compound of the general formula R—OCH$_2$CH$_2$O(CH$_2$CH$_2$O)$_n$CH$_2$CH$_2$OR′ where R and R′ are members taken from the class consisting of hydrogen and aliphatic carboxylic acyl radicals of 1 to 18 or more carbon atoms and $n$ is 7 to 200.

6. An aqueous alkaline developer solution containing hydroquinone and a polyethylene glycol containing 9 to 200 —CH$_2$CH$_2$O— units.

7. An aqueous alkaline developer solution containing hydroquinone and 0.1 to 2.5 grams per liter of solution of a polyethylene glycol containing 9 to 200 —CH$_2$CH$_2$O— units.

WILLIAM ALEXANDER STANTON.

REFERENCES CITED

The following references are of record in the file of this patent:

UNITED STATES PATENTS

| Number | Name | Date |
|---|---|---|
| 2,280,722 | Schneider et al. | Apr. 21, 1942 |
| 2,366,737 | Loder et al. | Jan. 9, 1945 |
| 2,441,389 | Blake | May 11, 1948 |

FOREIGN PATENTS

| Number | Country | Date |
|---|---|---|
| 14,714 | Great Britain | 1915 |